(12) United States Patent
Zhang et al.

(10) Patent No.: US 9,942,671 B2
(45) Date of Patent: Apr. 10, 2018

(54) METHOD FOR TRANSMITTING DIGITAL DATA PACKETS FROM A TRANSMITTER TO A RECEIVER ARRANGED IN A MOBILE DEVICE, AND MOBILE DEVICE, TRANSMITTER AND HEARING AID FOR IMPLEMENTING THE METHOD

(71) Applicant: SIVANTOS PTE. LTD., Singapore (SG)

(72) Inventors: Jie Zhang, Beijing (CN); Mattias Lampe, Wolfenbuettel (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 15/153,958

(22) Filed: May 13, 2016

(65) Prior Publication Data
US 2016/0337763 A1 Nov. 17, 2016

(30) Foreign Application Priority Data
May 13, 2015 (DE) .......................... 10 2015 208 948

(51) Int. Cl.
*H04R 25/00* (2006.01)
*H04L 1/00* (2006.01)
*H04L 29/06* (2006.01)

(52) U.S. Cl.
CPC .......... *H04R 25/554* (2013.01); *H04L 1/0006* (2013.01); *H04L 65/602* (2013.01); *H04L 65/604* (2013.01); *H04R 25/558* (2013.01); *H04R 2225/33* (2013.01); *H04R 2225/55* (2013.01); *H04R 2460/03* (2013.01)

(58) Field of Classification Search
CPC ............................ H04R 25/554; H04W 72/048
USPC ....... 370/213, 216, 242, 315, 230, 389, 476, 370/503, 335, 336; 375/295, 140, 343; 381/312, 315; 455/3.03, 525; 705/14.23; 706/12; 713/600
See application file for complete search history.

(56) References Cited

U.S. PATENT DOCUMENTS

| | | | |
|---|---|---|---|
| 5,602,831 A | 2/1997 | Gaskill | |
| 7,298,799 B1 * | 11/2007 | Venkatesh | H04B 1/7077 375/343 |
| 7,333,460 B2 | 2/2008 | Väisänen et al. | |
| 7,702,355 B2 * | 4/2010 | Jonsson | H04W 48/20 455/435.3 |
| 8,194,901 B2 | 6/2012 | Alber et al. | |

(Continued)

FOREIGN PATENT DOCUMENTS

| | | |
|---|---|---|
| EP | 1463242 A2 | 9/2004 |
| EP | 1883273 A1 | 1/2008 |

*Primary Examiner* — Gerald Gauthier
(74) *Attorney, Agent, or Firm* — Laurence A. Greenberg; Werner H. Stemer; Ralph E. Locher (57) ABSTRACT

A method transmits a multiplicity of digital data packets from a transmitter to a receiver arranged in a mobile device. A plurality of data packets in each case is combined to form a block. The multiplicity of data packets are sent out by the transmitter in such a manner that the time intervals between the individual data packets of the respective block vary over the blocks for a plurality of successive blocks, and/or the time duration of the blocks varies for a plurality of successive blocks, and/or the time intervals between the individual data packets in the block vary for a number of blocks. The blocks of data packets are received and decoded by the receiver.

9 Claims, 4 Drawing Sheets

(56) References Cited

U.S. PATENT DOCUMENTS

| | | | | |
|---|---|---|---|---|
| 8,300,524 B1* | 10/2012 | Carson | ............... | H04L 63/126 370/230 |
| 8,503,703 B2* | 8/2013 | Eaton | ............... | H04R 25/70 381/312 |
| 8,804,483 B2* | 8/2014 | Shi | ............... | H04L 25/00 370/205 |
| 9,078,265 B2* | 7/2015 | Harnay | ............... | H04W 76/026 |
| 2003/0152052 A1* | 8/2003 | Kekki | ............... | H04Q 11/0478 370/335 |
| 2005/0025221 A1* | 2/2005 | Lindsey | ............... | H04L 1/0003 375/140 |
| 2005/0144146 A1* | 6/2005 | Gong | ............... | H04B 1/7095 706/12 |
| 2005/0152329 A1 | 7/2005 | Krishnan et al. | | |
| 2006/0215592 A1* | 9/2006 | Tomoe | ............... | H04L 45/00 370/315 |
| 2006/0291680 A1* | 12/2006 | Roeck | ............... | H04R 25/554 381/315 |
| 2007/0269065 A1* | 11/2007 | Kilsgaard | ............... | H04R 25/554 381/315 |
| 2008/0313486 A1* | 12/2008 | Parfitt | ............... | G05B 19/054 713/600 |
| 2009/0097588 A1* | 4/2009 | El-Agha | ............... | H04J 3/0602 375/295 |
| 2009/0268730 A1* | 10/2009 | Sanjeewa | ............... | H04L 1/0002 370/389 |
| 2009/0286468 A1* | 11/2009 | Kim | ............... | H04L 1/1816 455/3.03 |
| 2010/0054283 A1* | 3/2010 | Jin | ............... | H04J 3/0664 370/503 |
| 2010/0296388 A1* | 11/2010 | Shimizu | ............... | H04L 1/0002 370/216 |
| 2011/0058484 A1* | 3/2011 | Kim | ............... | H04N 21/434 370/242 |
| 2012/0203610 A1* | 8/2012 | Grigg | ............... | G06Q 30/06 705/14.23 |
| 2012/0310395 A1 | 12/2012 | El-Hoiydi | | |
| 2014/0112354 A1* | 4/2014 | Yin | ............... | H04L 65/605 370/476 |
| 2014/0269627 A1* | 9/2014 | Gorokhov | ............... | H04W 72/0446 370/336 |
| 2015/0125013 A1* | 5/2015 | Secall | ............... | G10L 19/167 381/315 |
| 2016/0057549 A1* | 2/2016 | Marquis | ............... | H03G 3/344 381/315 |
| 2016/0134979 A1* | 5/2016 | El-Hoiydi | ............... | H04B 1/715 381/315 |
| 2016/0337763 A1* | 11/2016 | Zhang | ............... | H04L 1/0006 |

* cited by examiner

METHOD FOR TRANSMITTING DIGITAL DATA PACKETS FROM A TRANSMITTER TO A RECEIVER ARRANGED IN A MOBILE DEVICE, AND MOBILE DEVICE, TRANSMITTER AND HEARING AID FOR IMPLEMENTING THE METHOD

CROSS-REFERENCE TO RELATED APPLICATION

This application claims the priority, under 35 U.S.C. § 119, of German application DE 10 2015 208 948.7, filed May 13, 2015; the prior application is herewith incorporated by reference in its entirety.

BACKGROUND OF THE INVENTION

Field of the Invention

The invention relates to a method for transmitting a multiplicity of digital data packets from a transmitter to a receiver arranged in a mobile device, a plurality of data packets in each case being combined to form a block and blocks of data packets being received and decoded by the receiver.

For hearing aids, digital wireless connections have hitherto been used primarily for being able to adjust operating parameters of the hearing aid, such as, for example, the volume, from a handset. In recent times, digital wireless transmission protocols are also used for streaming audio data from a source configured for this purpose, for example a television set or a telephone, to the hearing aid. In this connection, the source has a wire-based signal link to a transmitter which sends out a digital radio signal which can be received by a hearing aid which is equipped with a corresponding receiver.

In this connection, hearing aids often have two operating modes: in the regular mode, a microphone or microphone system of a hearing aid in each case picks up acoustic signals from the environment which are amplified in the hearing aid and are correspondingly reproduced to the ear of the user by means of a loudspeaker. In the streaming mode, a digital radio signal in which audio data are coded is received by the receiver and the audio data are reproduced by the loudspeaker. Optionally, a handset can also be provided here for controlling the volume or for changing between the operating modes etc.

Due to the demands on the size and the life of a battery in a hearing aid, considerable restrictions result in a hearing aid. A transmission protocol transmits the audio data usually in short-time data packets with a comparatively high data rate, the digital data being modulated mostly onto an analog carrier signal of a particular frequency. In most cases, a transmission protocol provides for a number of carrier frequencies which in each case form a transmission channel by the corresponding modulation of the digital data. In an interval between two data packets, the carrier signal is modulated in none of the transmission channels by the transmitter. Within this period, the power supply can be reduced in the receiver of the hearing aid to a minimum for stand-by operation in order to save energy.

Since, for a stable reproduction of the transmitted audio data, this rest period must be compensated for by a correspondingly higher data rate in the transmission of the data packets and, on the other hand, the received audio data of the data packets are temporarily stored in a memory and read out of the latter for the reproduction. The duration of a rest period between two data packets is usually only a few milliseconds in a transmission protocol in order to be able to keep time delays, among other things, as short as possible when reading out the memory. The operating voltage of batteries which are used in conventional hearing aids is mostly of an order of magnitude of 1.5 Volts. For those applications in a hearing aid which require a higher voltage, the operating voltage of the battery is raised, for example via a voltage upconverter (step-up converter). The control system for the stability of the voltage is limited for reasons of efficiency, among other things, by the capacity of the capacitors used for smoothing.

These restrictions in the voltage or power supply can lead to the following problem in the operation of the signal receiving unit: during the reception of the data packet, the receiver draws a comparatively high current which can be up to a few milliamperes. During the rest periods in which no data packets are transmitted, the consumption of the receiver is distinctly lower. The control system for the stability of the voltage is usually not designed for keeping the voltage provided by the battery completely constant with such fluctuations in the current consumption. As a result, the periodic power operation of the receiver and other signal processing units which are connected to it leads to periodic changes in the operating voltage.

Since the analog circuits for signal processing in the hearing aid such as, for example, the amplification or preamplification are operated via this operating voltage and the periodic fluctuations in the operating voltage are caused by the reception of data packets in the receiver, 100 to some 1000 data packets being received per second depending on the transmission protocol, these fluctuations in the operating voltage can create audible artifacts in the reproduced sound signal of the hearing aid.

SUMMARY OF THE INVENTION

The invention is, therefore, based on the object of specifying a method for transmitting digital data packets from a transmitter to a receiver arranged in a mobile device which, with low energy consumption, has the least possible effects on the stability of the operating voltage of the mobile device.

According to the invention, the object is achieved by a method for transmitting a multiplicity of digital data packets from a transmitter to a receiver arranged in a mobile device, a plurality of data packets in each case being combined to form a block, the multiplicity of data packets being sent out by the transmitter in such a manner that deterministically. The time intervals between the individual data packets of the respective block vary over the blocks for a plurality of successive blocks, and/or the time duration of the blocks varies for a plurality of successive blocks, and/or the time intervals between the individual data packets in the block vary for a number of blocks, and the blocks of data packets being received and decoded by the receiver. Advantageous and inventive embodiments partially considered individually are the subject matter of the subclaims and of the subsequent description.

In particular, the fact that the time intervals between the individual data packets of the respective block vary over the blocks for a plurality of successive blocks is meant to mean that in each individual one of the successive blocks considered the individual time intervals between the data packets of the block have a constant value which varies over the successive blocks considered. In this context, the time interval from the end time of a data packet to the start time of the subsequent data packet, in particular, can be utilized for the definition of the time interval between two successive data packets. The two times mentioned as well as a data packet as such can be defined via a transmitting activity of the transmitter, for example via a transmitting power present in a transmission channel. The time duration of a block, in particular, can be defined by the distance of the starting time of the first data packet of the block from the starting time of the first data packet of the next block.

In this context, a reception and a decoding of the blocks of data packets by the receiver also contains the possibility that, due to transmission losses, not all data packets of a block are received completely. The decoding in this case contains the reading out of the data provided for further processing in a data packet, the removal of protocol-specific information in a preamble of a data packet from the data provided for further processing, the consideration of redundant data, taking place only once, in a number of data packets of a block for further processing, and generally the provision of the useful information coded by the data packets of a block. A variation of the time intervals between data packets or the durations of the blocks, respectively, contains, in particular, that, in a plurality of time intervals or durations of the blocks considered, at least one value deviates from the other ones by more than one tolerance amount.

The starting point of the invention is the transmission of the digital data in data packets delimited in time, having a high data rate in each case. The advantages resulting for the energy consumption of the mobile device during the times free of transmission, and thus also of reception, are thus retained as well as the extensive possibilities for correction of transmission errors of individual bit values by redundancies correspondingly provided for this purpose in the data packets or distinct redundancy data packets. The reception of an individual data packet can lead to a fluctuation of the operating voltage in the mobile device which, additionally, can be all the greater the higher the data rate of the data packet is, that is to say the more different signal characters are to be resolved per unit time on reception. A time-continuous transmission of the data, initially conceivable in this respect, or a lowering of the data rate of the data packets with an extension in time of the individual data packets, which would lead to a reduction in the time free of transmission, is discarded based on the above-mentioned considerations.

The invention then recognizes that disturbances in the analog signal processing of the mobile device, which are caused by the fluctuations in the operating voltage, only become significant at all due to the high regularity of the receiver activity caused by the disturbances. If, for example, further processing of the received data packets to form an audio signal is provided in the mobile device, disturbances in the analog signal processing of the mobile device which are caused by the fluctuations of the operating voltage lead to interfering noises in the audio signal to be output only due to the high regularity of the received data packets, with well defined frequencies in the audio signal which can be perceived audibly.

The invention counters this by breaking through the strict periodicity on sending and receiving the individual data packets. This leads to the voltage fluctuations not being repeated at a preset frequency on reception of the data packets and leading to an interference signal of the corresponding frequency in the analog signal processing but rather possible interference signals being spread over a wider frequency range by frequency modulation of the reception of the data packets. While in this case the number of data packets to be sent out over a plurality of successive blocks, usually by a corresponding protocol for the further processing of the received data packets, is predefined and, as a result, a basic frequency for the reception of the data packets is defined, a corresponding signal can be modulated onto this basic frequency by a variation of the time intervals between individual data packets for such smoothing. For this purpose, the time intervals can be varied in a pseudo-random, quasi-chaotic manner, or simulate a deliberately selected modulation signal.

In this context, a variation of the time intervals between the individual data packets can be achieved, on the one hand, in that, within each block, the time intervals between the individual data packets have in each case a constant value up to the last data packet of the block in each case, this value varying, however, for various blocks following one another. In particular, the transmission-free rest period from the last data packet of a block up to the first data packet of a following block should not be used for calculating the time intervals. On the other hand, the time duration of the blocks can be varied for a plurality of successive blocks, as a result of which the periodicity of the data packets is broken through even in the case of identical time intervals in each case between the individual data packets for the blocks involved over these blocks. Furthermore, the time intervals between the data packets can also be varied directly in a block.

In this context, the transmitter and the receiver are to be equipped in each case with corresponding information about the time sequence of the data packets and thus about the individual time intervals to be expected. In addition, such a procedure has the advantage, in particular, that, in the case of a faulty or incomplete transmission of a data packet due to disturbances in a transmission channel used, negative effects for the reception of subsequent data packets can be avoided due to the predefined time intervals.

Preferably, a time-continuous reproduced signal is generated in the mobile device from data packets received by the receiver. In particular, it can be provided in this context that a number of data packets in a block carries an item of redundancy information so that a time-continuous reproduced signal can be generated in the mobile device even if not all data packets of a block are received completely and faultlessly. For the generation of a time-continuous reproduced signal, particularly of an audio signal, as stable as possible an operating voltage in the mobile device is particularly desirable in order to minimize effects of possible fluctuations of the operating voltage on signal processing of the reproduced signal. In this context, the proposed method contributes to a particular extent to fluctuations in the operating voltage only having unnoticeably perceptible effects.

The transmitter suitably sends out individual data packets in which in each case the digital information of a data packet is coded into an analog carrier signal of a preset frequency. In particular, this can be done by phase modulation or frequency modulation of the carrier signal. Such a coding is used particularly frequently in practice, temporarily producing a high energy consumption in the receiver of the mobile device especially in the case of comparatively high data rates due to the demodulation to be performed there of the information modulated onto the analog carrier signal. This high energy consumption can impair the stability of the operating voltage in the mobile device, a transmission of the data packets by the method proposed being able to prevent the formation of a periodic interference signal by the fluctuations of the operating voltage on the reception of the data packets in the mobile device.

It is also found to be advantageous if the frequencies of the respective analog carrier signals are varied by the transmitter for the multiplicity of data packets, and during this process the receiver utilizes stored information on the sequence of the frequencies of the analog carrier signals for the time intervals of successive data packets. In this process, the frequencies of the analog carrier signals are varied by the transmitter in accordance with a predetermined pattern so that a frequency band channel is formed by each of the frequencies used and possibly a bandwidth surrounding the frequency for a modulation.

The variation of the frequencies of the analog carrier signals for the transmission of different data packets thus means that individual data packets are transmitted on different frequency band channels. This so-called frequency hopping is a method frequently used in practice in the transmission of data packets in order to be able to minimize, in particular, data losses, which may occur due to possible disturbances in a frequency band channel, by distributing the transmission of the data packets to a number of frequency band channels in conjunction with sending out redundancy data packets. For this purpose, a list, determined by the respective transmission protocol, with the sequence of the frequency channels to be used for each data packet to be sent out is deposited in advance both at the transmitter and at the receiver.

This information available anyway in frequency hopping can now be supplemented by information about the respective time intervals to the subsequent data packet in each case with relatively little memory expenditure. Such a procedure also has the advantage, in particular, that in the case of a faulty or incomplete transmission of a data packet due to disturbances in the relevant frequency band channel, due to the predefined time intervals for the receiver, no effects need to be feared a priori for the reception of subsequent data packets.

Advantageously, the transmitter in each case inserts an information item about the starting time of the respective subsequent data packet into the data packets at the beginning thereof. Such information can additionally increase the stability of the transmission protocol in order to be able to compensate, for example, for errors in the reading out of stored information about the sequence and time intervals of the data packets at the receiver.

The time duration of the data packets preferably remains essentially identical during the sending out. This is understood to mean in particular that the time interval for which the transmitter outputs transmitting power for transmitting a data packet in a transmission channel remains identical for the data packets except for technically necessitated fluctuations. This makes it easier to determine the time intervals between the individual data packets.

The invention also mentions a transmitter which is configured to transmit a multiplicity of digital data packets to a mobile device by the method described above, and a mobile device containing a receiver which is configured to receive and to decode a multiplicity of digital data packets which are transmitted in accordance with the above-described method. The advantages listed for the method and its developments can be transferred correspondingly in this case to the transmitter and to the mobile device.

In an advantageous embodiment, the mobile device is configured as a hearing instrument, particularly a hearing aid, with a loudspeaker, which is configured to generate a reproduced audio signal from the received and decoded multiplicity of data packets and to reproduce this via the loudspeaker. Due to the restrictions in the dimensions and the battery power of a hearing instrument, the transmission of digital data packets according to the method described above is particularly advantageous for such a hearing instrument with regard to the stability of the operating voltage and thus the quality of the reproduced audio signal reproduced via the loudspeaker.

Other features which are considered as characteristic for the invention are set forth in the appended claims.

Although the invention is illustrated and described herein as embodied in a method for transmitting digital data packets from a transmitter to a receiver arranged in a mobile device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually corresponding parts and sizes are in each case provided with identical reference designations in all figures.

Figure 1:
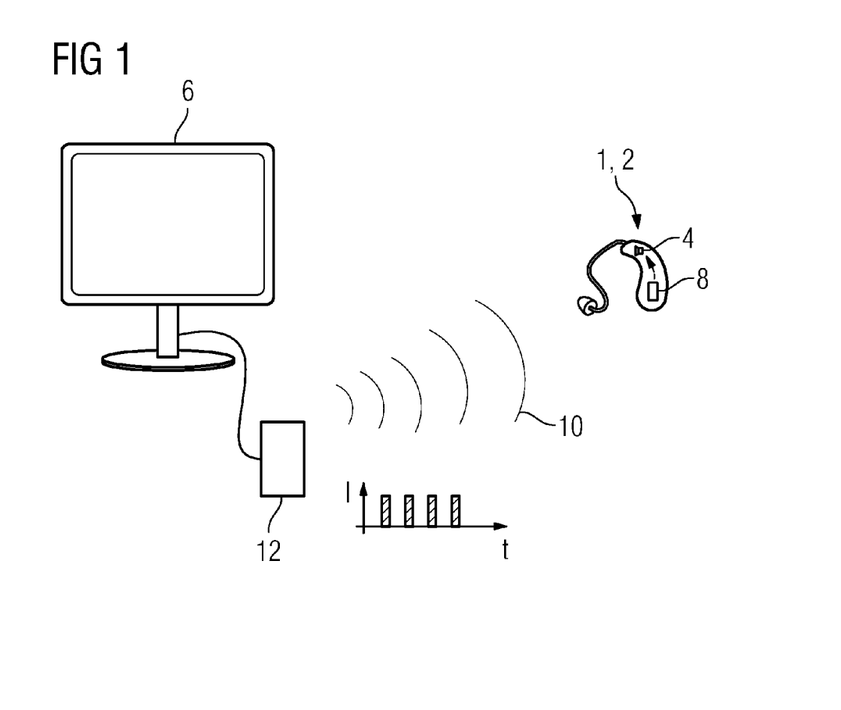
FIG. 1 is an illustration of a transmitter which transmits a digital signal for the reproduction of audio data to a hearing aid.

Referring now to the figures of the drawings in detail and first, particularly to FIG. 1 thereof, there is shown a mobile device 2 configured as a hearing aid 1 is shown diagrammatically. The hearing aid 1 is configured to record sound from the environment by a microphone, not shown in greater detail, to amplify it for correcting hearing impairment of a user of the hearing aid 1 and to reproduce it via a loudspeaker 4 to an ear of the user.

In order to provide the user, when using entertainment electronics as can be given, for example, by a television set 6, with a better quality of sound than would be possible by the acoustic recording and reproduction of the sound generated by the loudspeakers of the television set 6, described above, the hearing aid 1 is equipped with a receiver 8 which is configured to receive a digital signal 10 which is sent out by a transmitter 12 connected to the television set 6. In this arrangement, the receiver 8 can have, for example, an antenna and a decoder which decodes, and correspondingly processes, signals received by the antenna for further audio-specific signal processing in the hearing aid 1.

In the digital signal 10, the respective current sound track of the television set 6 is coded in the process. The hearing aid 1 can thus receive the sound track digitally via the receiver 8 so that losses of sound on the acoustic transmission path from the loudspeakers of the television set 6 via the environment to the microphone of the hearing aid 1 can be avoided.

Figure 2:
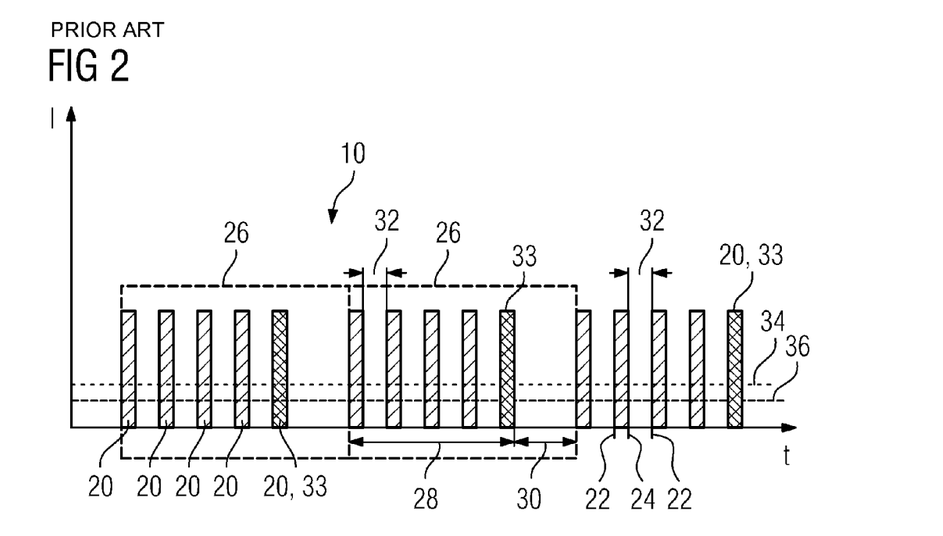
FIG. 2 is an illustration showing variation with time of the signal according to FIG. 1 in a transmission according to the prior art.

FIG. 2 shows the variation with time of the digital signal 10 according to FIG. 1 which is sent out by the transmitter 12 according to the prior art. In this figure, the instantaneous volume of data I in all transmission channels is plotted with respect to a time axis t. In the digital signal 10, the information is transmitted in data packets 20. An individual data packet 20 here represents a unit terminated in time. From the starting time 22 up to the end time 24 of an individual data packet 20, the signal is modulated continuously in accordance with the bit values to be transmitted in a particular transmission channel which can be determined, for example, by a carrier frequency. Between various data packets 20 there is no transmission of information, i.e. if the transmitter is emitting transmitting power at all, this goes into an unmodulated carrier frequency.

The data packets 20 are in each case combined to form coherent blocks 26 ("frames"). In each block 26, all data packets 20 of the respective block 26 are in this case sent out in a transmitting time 28. After conclusion of the last data packet 20, a rest period 30 begins up to the beginning of the next block 26 in which no further data packets are sent out. The rest period 30 lasts longer than the time interval 32 between two successive data packets 20 in this case. The information coded in the data packets 20 of a block 26 is partially redundant here in order to provide for a reproduction, nevertheless, in the case of a transmission error of a data packet 20. This can be done, for example, by individual redundancy packets 33 provided for this purpose. An individual block 26 in this case represents the smallest unit provided in the transmission protocol, which can be reproduced after decoding. The mean data rate 34 of the transmitter relates to the quantity of data actually sent out, averaged over a number of blocks 26. Due to the redundancies, the mean volume of data 36 as the quantity of transmitted information, averaged over a number of blocks 26, is less than the mean data rate 34. Minus information which relates to instructions for the protocol and is usually stored in a preamble of each data packet 20, the mean volume of data 36 corresponds to the sample rate in the reproduction in the ideal case.

Due to the fact that the time intervals 32 between the respective data packets 20 are in each case identical within the individual blocks 26 and due to the fact that the transmitting periods 28 and rest periods 30 are in each case identical over the blocks, the temporal pattern which is formed by the sequence of transmitting the data packets 20 over the blocks 32 remains identical. However, in the receiver 8 of the hearing aid 1, the reception of the data packets 20 leads to fluctuations in the operating voltage which largely simulate this temporal pattern. These voltage fluctuations also affect the analog signal processing in the hearing aid.

Due to the regularities in the time intervals 32 between the data packets 20 and in the transmitting times 28 and rest periods 30, said voltage fluctuations modulate the frequency corresponding to the inverse time intervals 32 as interfering noise onto a useful signal in the analog signal processing. Since the transmission protocols usually provide time intervals of the order of magnitude of milliseconds, particularly between 0.1 ms and 10 ms, such interfering noises are audible to a user of the hearing aid 1 due to the corresponding frequencies (within the range of 100 Hz to 10 kHz). In order to suppress such interfering noises in the analog signal processing, the sequence in time of the data packets 20 can now be varied when they are sent out, as shown in the text which follows.

Figure 3:
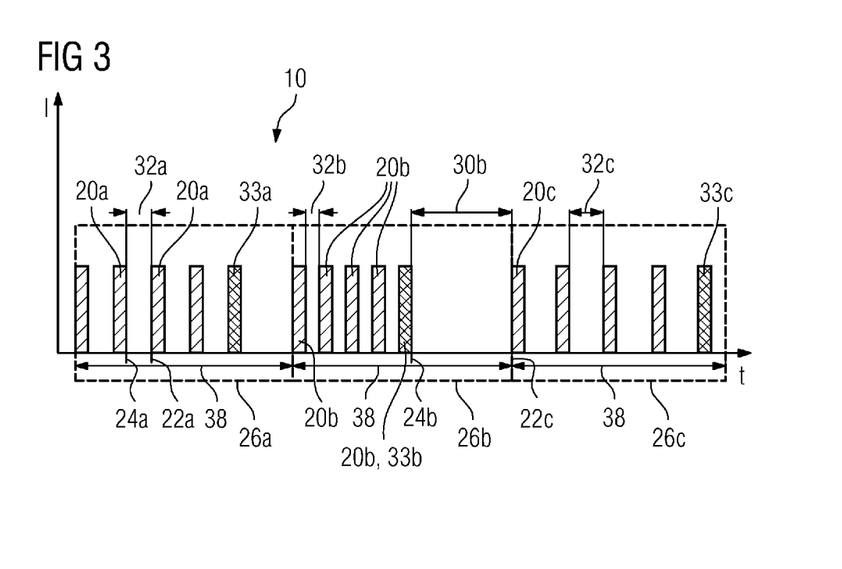
FIG. 3 is an illustration showing the variation with time of the signal with a variation of the time intervals of the data packets for the respective block over a number of blocks.

FIGS. 3-6 in each case show the variation of the digital signal 10 by plotting the instantaneous volume of data I in all transmission channels with respect to a second axis t. In FIG. 3, the duration 38 for the individual blocks 26a, 26b, 26c is in each case identical, the time intervals 32a, 32b, 32c between the individual data packets 20 of the respective blocks 26a, 26b, 26c in each case being constant block by block but having different values in each case for different blocks 26a, 26b, 26c. The distance 32a between two data packets 20a is to be defined in each case as the time between an end time 24a of a data packet 20a up to a starting time 22a of the subsequent data packet 20a. In this context, only the time intervals up to the respective last data packet 33a, 33b, 33c of the respective block 26a, 26b, 26c are used for defining the time intervals 32a, 32b, 32c. The time interval from an end time 24b of the last data packet 33b of a block 26b up to the starting time 22c of a first data packet 20c of the following block 26c which, at the same time, marks the starting time of block 26c is not considered as time interval 32b within block 26b, according to definition, but as rest period 30b in which the transmission of all data packets 20b, 33b of block 26b is already concluded.

Figure 4:
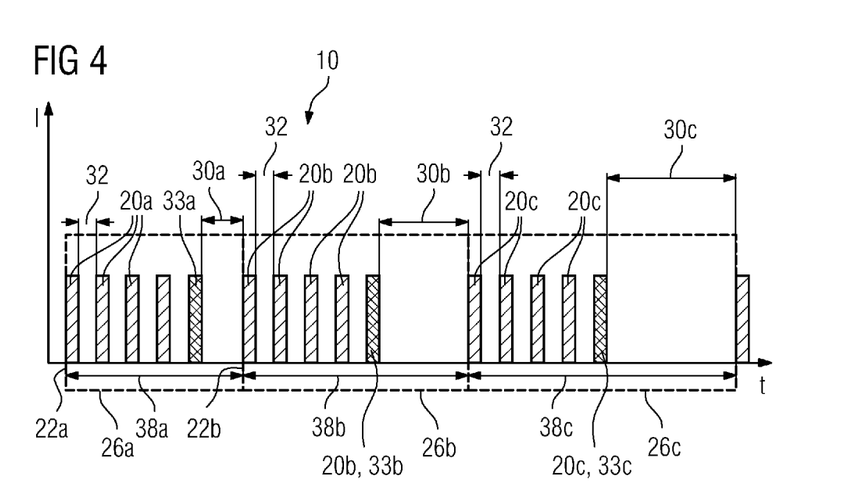
FIG. 4 is an illustration showing the variation with time of the signal with a variation of the duration of the individual blocks.

The variation with time, shown in FIG. 4, of the digital signal 10 shows individual blocks 26a, 26b, 26c of data packets 20a, 20b, 20c, blocks 26a, 26b, 26c in each case having a different duration 38a, 38b, 38c. The duration 38a of a block 26a is here defined as the time between the starting time 22a of the first data packet 20a of block 26a up to the starting time 22b of the first data packet 20b of the following block 26b. The time intervals 32 between two data packets 20a or 20b or 20c, respectively, are identical for all blocks 26a, 26b, 26c. The variation of the durations 38a, 38b, 38c of blocks 26a, 26b, 26c is achieved by in each case different rest periods 30a, 30b, 30c, that is to say in each case a time free of transmission of different length after the respective last data packet 33a, 33b, 33c in block 26a or 26b or 26c, respectively, up to the beginning of the next block.

Figure 5:
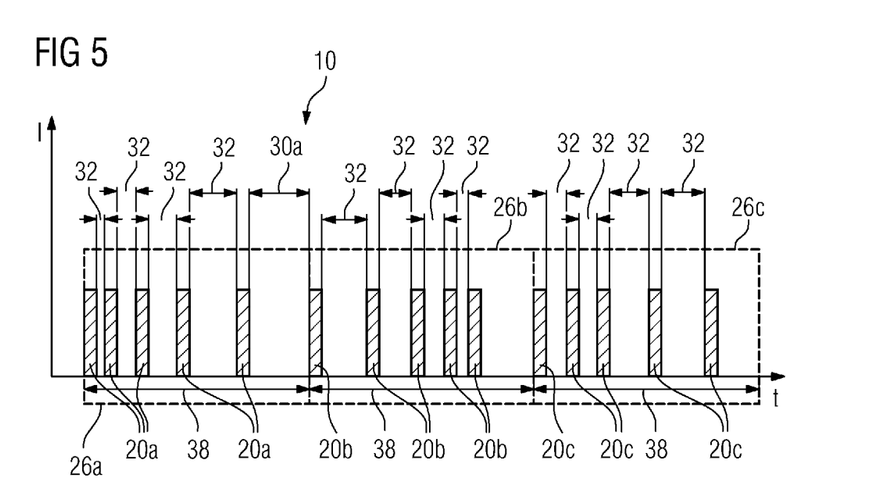
FIG. 5 is an illustration showing the variation with time of the signal with a variation of the time intervals of the data packets in the individual blocks.

FIG. 5 shows the variation with time of the digital signal 10 in which the individual blocks 26a, 26b, 26c have in each case the same duration 38, but the time intervals 32 between individual data packets 20 of a respective block 26a or 26b or 26c, respectively, vary. In the version shown here, the time intervals 32 between the data packets 20a of a first block 26a increase continuously, whereas the time intervals 32 between the individual data packets 20b of the subsequent block 26b decrease continuously. Over the time intervals 32 in the first block 26a, the rest period 30a in the first block 26a and the time intervals 32 in the second block 26b, the modulation of a discretized sinusoidal half wave train can here be simulated by the temporal pattern of the data packets 20a, 20b of blocks 26a, 26b. Block 26c shows a further possibility of varying the time intervals 32 between the individual data packets 20c within block 26c. The first and the second time intervals 32 or the third and the fourth time intervals 32, respectively, between the individual data packets 20c are in each case identical to one another.

Figure 6:
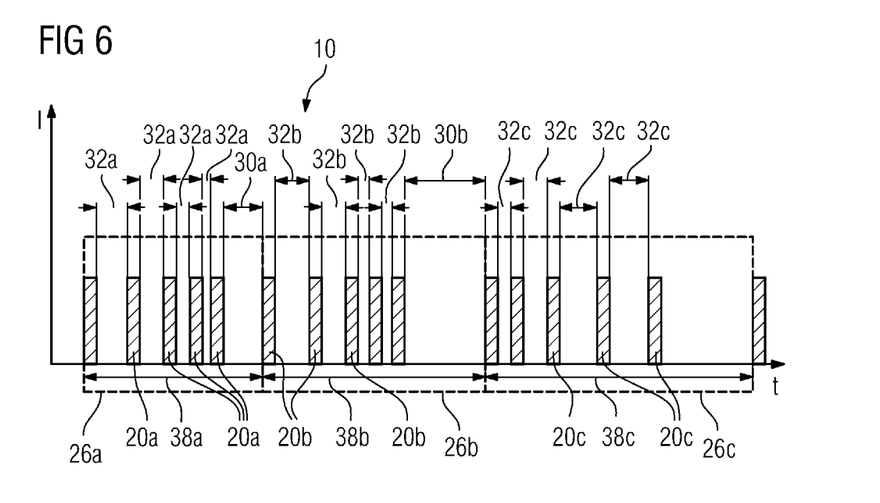
FIG. 6 is an illustration showing the variation with time of the signal with a combination of the variations according to FIG. 3, FIG. 4 and FIG. 5.

FIG. 6 shows the variation with time of a digital signal 10 which combines the variations, shown in FIGS. 3-5, of the time intervals between data packets and the different durations 38a, 38b, 38c of the individual blocks 26a, 26b, 26c. In the present case, the time intervals 32a between the data packets 20a of the first block 26a decrease continuously. The same temporal pattern is found in the case of the time intervals 32b between the data packets 20b of the second block 26b. Due to a rest period 30b, which is longer compared with the rest period 30a of the first block 26a, of the second block 26b, the latter has a longer duration 38b compared with the first block 26a. By comparison, the time intervals 32c increase continuously between the data packets 20c in the third block 26c, block 26c also having a longer duration 38c than the two preceding blocks 26a, 26b. Other possible combinations of the variations of time intervals between data packets and durations of the blocks, shown here, are conceivable.

Figure 7:
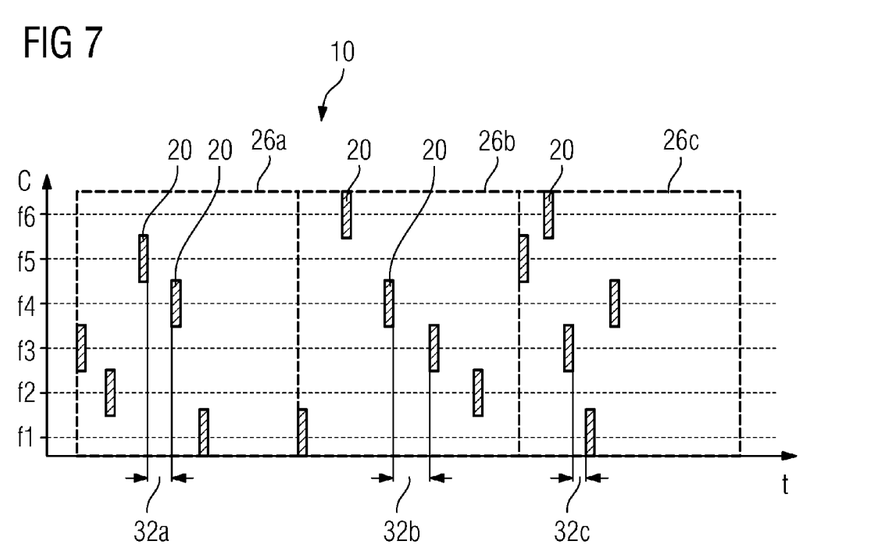
FIG. 7 is an illustration showing the variation with time of the signal with variable time intervals of the data packets with a distribution of the transmission to a number of frequency band channels.

FIG. 7 shows the variation with time of the digital signal 10 when the transmission of the data packets 20 is distributed to a number of frequency band channels. In the case shown here, a new frequency band channel C is used in each case for each data packet 20 of a block 26a, 26b, 26c. Such a frequency band channel C is here in each case defined by the frequency f1-f6 of a carrier signal and a certain bandwidth provided for the modulation of the bits of the digital signal 10 onto the carrier signal. The time intervals 32a, 32b, 32c between data packets 20 are in each case constant within a block 26a or 26b or 26c, respectively, but vary over the individual blocks 26a, 26b, 26c.

The sequence of the individual frequency band channels C for the transmission of the data packets 20 is predefined in the transmitter and in the receiver by means of a corresponding table. This information, which is already present, can now be supplemented by additional time differences and also used in the transmitter and in the receiver for the time interval 32a, 32b, 32c to the data packet 20 following in each case. By this utilizing of information, used in the protocol in any case, for determining the time intervals 32a, 32b, 32c, the expenditure of memory and software for the variation of the time intervals 32a, 32b, 32c can be reduced, particularly on the side of the receiver, which simplifies the method for the transmission. Depending on the transmission protocol, a preamble of a data packet 20 can also contain an information item with respect to the frequency band channel C in which the data packet 20 following in each case is transmitted. In this case, too, the preamble of the data packet can be supplemented by an information item with respect to the time interval to the next data packet 20. Such an information item can also be conducted independently of information relating to the frequency band channel C.

Although the invention has been illustrated and described in greater detail by the preferred exemplary embodiment, the invention is not restricted by this exemplary embodiment. Other variations can be derived therefrom by the expert without departing from the scope of the invention.

The following is a summary list of reference numerals and the corresponding structure used in the above description of the invention:
1 Hearing aid
2 Mobile device
4 Loudspeaker
6 Television set
8 Receiver
10 Digital signal
12 Transmitter
20, 20a-c Data packet
22, 22a-c Starting time
24, 24a-c End time
26, 26a-c Block
28, 28a-c Transmitting time
30, 30a-c Rest period
32, 32a-c Distance between two data packets
33, 33a-c Redundancy packet
34 Mean data rate
36 Mean volume of data
38, 38a-c Duration of a block
C Frequency band channel
f1-f6 Frequency of the carrier signal
I Volume of data
t Time axis

The invention claimed is:

1. A method for transmitting a multiplicity of digital data packets from a transmitter to a receiver disposed in a mobile device, which comprises the steps of:
combining a plurality of the digital data packets in each case to form a block;
transmitting the multiplicity of digital data packets via the transmitter in such a manner that deterministically:
time intervals between individual data packets of the block vary over blocks for a plurality of successive blocks; and/or
a time duration of the blocks varies for the plurality of successive blocks; and/or
the time intervals between the individual data packets in the block vary for a number of blocks; and
receiving and decoding the blocks of the data packets in the receiver.

2. The method according to claim 1, which further comprises generating a time-continuous reproduced signal in the mobile device from the digital data packets received by the receiver.

3. The method according to claim 1, which further comprises sending out, via the transmitter, the individual data packets such that in each case digital information of a digital data packet is coded into an analog carrier signal of a firmly predetermined frequency.

4. The method according to claim 3, which further comprises varying frequencies of respective analog carrier signals by the transmitter for the multiplicity of digital data packets, and the receiver utilizes stored information on a sequence of the frequencies of the respective analog carrier signals for the time intervals of successive data packets.

5. The method according to claim 1, wherein the transmitter in each case inserts an information item about a starting time of a respective subsequent data packet into the digital data packets at a beginning thereof.

6. The method according to claim 1, wherein the time duration of the digital data packets remains essentially identical during a sending out.

7. A transmitter configured to transmit a multiplicity of digital data packets to a mobile device by means of a method according to claim 1.

8. A mobile device, comprising:
a receiver configured to receive and to decode a multiplicity of digital data packets which are transmitted in accordance with a method according to claim 1.

9. A hearing aid, comprising:
a receiver configured to receive and to decode a multiplicity of digital data packets which are transmitted in accordance with a method according to claim 1; and a loudspeaker coupled to said receiver and configured to generate a reproduced audio signal from received and decoded multiplicity of data packets and to broadcast the reproduced audio signal via said loudspeaker.

* * * * *